US009278680B2

(12) United States Patent
Seguchi

(10) Patent No.: US 9,278,680 B2
(45) Date of Patent: Mar. 8, 2016

(54) CONTROL DEVICE AND CONTROL METHOD FOR VEHICLE

(71) Applicant: Hiroaki Seguchi, Toyota (JP)

(72) Inventor: Hiroaki Seguchi, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 30 days.

(21) Appl. No.: 14/160,908

(22) Filed: Jan. 22, 2014

(65) Prior Publication Data

US 2014/0207358 A1 Jul. 24, 2014

(30) Foreign Application Priority Data

Jan. 24, 2013 (JP) ................................. 2013-011250

(51) Int. Cl.
| | |
|---|---|
| *B60W 10/06* | (2006.01) |
| *B60W 30/17* | (2012.01) |
| *B60W 10/18* | (2012.01) |
| *B60W 30/18* | (2012.01) |
| *B60W 50/00* | (2006.01) |

(52) U.S. Cl.
CPC ............ *B60W 10/06* (2013.01); *B60W 10/182* (2013.01); *B60W 30/17* (2013.01); *B60W 30/18018* (2013.01); *B60W 2050/0091* (2013.01); *B60W 2540/10* (2013.01); *B60W 2540/106* (2013.01); *B60W 2540/18* (2013.01)

(58) Field of Classification Search
CPC ... B60W 10/06; B60W 10/182; B60W 30/17; B60W 30/18018; B60W 2050/0091; B60W 2540/10; B60W 2540/106; B60W 2540/18
See application file for complete search history.

(56) References Cited

U.S. PATENT DOCUMENTS

| | | | | |
|---|---|---|---|---|
| 8,078,382 | B2 * | 12/2011 | Sugano et al. | ................... 701/96 |
| 8,348,808 | B2 * | 1/2013 | Bollig et al. | ................... 477/183 |
| 2002/0020247 | A1 * | 2/2002 | Kojima et al. | ................... 74/512 |
| 2005/0010352 | A1 * | 1/2005 | Michi et al. | ................... 701/96 |
| 2005/0216169 | A1 * | 9/2005 | Arai | ................... 701/96 |
| 2006/0212207 | A1 * | 9/2006 | Sugano et al. | ................... 701/93 |
| 2009/0118880 | A1 * | 5/2009 | Heap | ............ B60K 6/365 701/22 |

(Continued)

FOREIGN PATENT DOCUMENTS

| | | | |
|---|---|---|---|
| JP | 2000045819 A | * | 2/2000 |
| JP | 2012-206593 A | | 10/2012 |

(Continued)

OTHER PUBLICATIONS

JP 2012-206593 (Translation).pdf. Translation of JP 2012-206593.*

(Continued)

*Primary Examiner* — Rami Khatib
*Assistant Examiner* — Jeffrey Boomer
(74) *Attorney, Agent, or Firm* — Dinsmore & Shohl LLP

(57) ABSTRACT

A control device for a vehicle executes an adaptive cruise control and an idle stop control. The control device automatically starts an internal combustion engine when an operation amount of a start operating member different from a brake pedal is larger than or equal to a predetermined amount while the idle stop control is being executed. The control device sets the predetermined amount to a first predetermined amount when the adaptive cruise control is not executed. The control device sets the predetermined amount to a second predetermined amount smaller than the first predetermined amount when the adaptive cruise control is being executed.

8 Claims, 9 Drawing Sheets

(56) References Cited

U.S. PATENT DOCUMENTS

| | | | |
|---|---|---|---|
| 2010/0038158 A1* | 2/2010 | Whitney | B60K 6/365 180/65.265 |
| 2010/0063661 A1* | 3/2010 | Saito | 701/22 |
| 2010/0138123 A1* | 6/2010 | Tokimasa | B60T 7/18 701/70 |
| 2012/0191317 A1* | 7/2012 | Mueller-Lerwe et al. | 701/93 |
| 2012/0283936 A1* | 11/2012 | Hashemi et al. | 701/113 |
| 2013/0005532 A1* | 1/2013 | Gibson et al. | 477/115 |
| 2013/0297124 A1* | 11/2013 | Be | G06F 17/00 701/22 |
| 2014/0012488 A1* | 1/2014 | Proebstle et al. | 701/113 |
| 2014/0277989 A1* | 9/2014 | Krueger et al. | 701/96 |

FOREIGN PATENT DOCUMENTS

| | | | |
|---|---|---|---|
| JP | 2012206593 A | * | 10/2012 |
| KR | 2005108636 A | * | 11/2005 |

OTHER PUBLICATIONS

JP 2000-045819 (Translation).pdf . Translation of JP 2000-045819.*

KR_2005-0108636_A (Translation).pdf . Translation of KR 2005-0108636A obtained from KPION.*

* cited by examiner

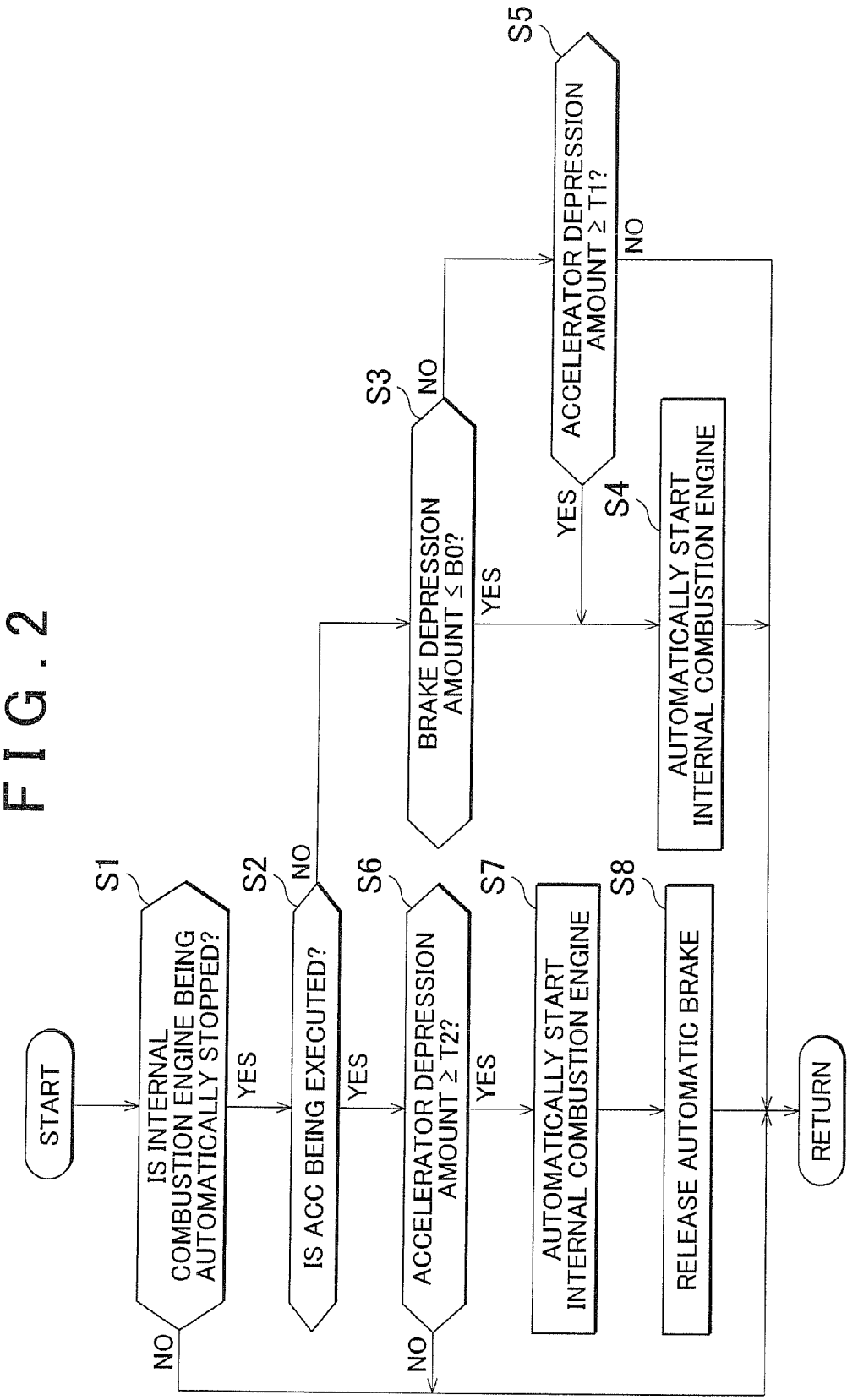

CONTROL DEVICE AND CONTROL METHOD FOR VEHICLE

INCORPORATION BY REFERENCE

The disclosure of Japanese Patent Application No. 2013-011250 filed on Jan. 24, 2013 including the specification, drawings and abstract is incorporated herein by reference in its entirety.

BACKGROUND OF THE INVENTION

1. Field of the Invention

The invention relates to a control device and control method for a vehicle, which execute an adaptive cruise control (ACC) and an idle stop control.

2. Description of Related Art

An adaptive cruise control (hereinafter, referred to as ACC) is known as one of vehicle controls for causing a host vehicle to follow a preceding vehicle. In the ACC, a distance to the preceding vehicle is kept constant, and the host vehicle is stopped when the preceding vehicle has stopped. Japanese Patent Application Publication No. 2012-206593 (JP 2012-206593 A) describes one example of vehicle control in which an idle stop control is executed together with the above-described ACC. In the idle stop control, an internal combustion engine is automatically stopped and automatically started. In this vehicle control, the host vehicle is stopped by activating an automatic brake through ACC when the preceding vehicle has stopped, and the internal combustion engine is automatically stopped when an automatic stop condition for the internal combustion engine is satisfied in this state. In addition, when a predetermined start operation is conducted by a driver, the internal combustion engine is automatically started and the automatic brake is released.

SUMMARY OF THE INVENTION

Incidentally, in a normal idle stop control, the internal combustion engine is automatically started through an operation to ease up depression of a brake pedal. However, while ACC is being executed, the internal combustion engine is not automatically started even when depression of the brake pedal is eased up, and the vehicle is kept stopped by the automatic brake. That is, when ACC and idle stop control are being executed together, the internal combustion engine cannot be automatically started through a starting operation, that is, depression of the brake pedal is eased up, which is most frequently carried out in a normal idle stop control. Therefore, a driver is required to conduct a starting operation different from a brake operation in order to automatically start the internal combustion engine, so convenience at the time of automatically starting the internal combustion engine may deteriorate. The vehicle control described in JP 2012-206593 A does not consider the above inconvenience, and there is still room for improvement.

The invention provides a control device and control method for a vehicle, which are able to improve convenience at the time when an automatically stopped internal combustion engine is automatically started in the case where ACC and an idle stop control are executed together.

A first aspect of the invention provides a control device for a vehicle including a internal combustion engine, a brake pedal, and a start operating member that is different from the brake pedal. The control device includes an electronic control unit. The electronic control unit is configured to execute an adaptive cruise control and to execute an idle stop control. The electronic control unit is configured to automatically start the internal combustion engine when an operation amount of the start operating member is larger than or equal to a predetermined amount while the idle stop control is being executed. The electronic control unit is configured to set the predetermined amount to a first predetermined amount when the adaptive cruise control is not executed. The electronic control unit is configured to set the predetermined amount to a second predetermined amount when the adaptive cruise control is being executed. The second predetermined amount is smaller than the first predetermined amount.

With the above configuration, while the adaptive cruise control is being executed, the operation amount of the start operating member, required to automatically start the internal combustion engine, reduces as compared to that while the adaptive cruise control is not executed. Therefore, the driver is allowed to automatically start the internal combustion engine with a smaller operation amount, and it is possible to improve convenience at the time when the internal combustion engine is automatically started.

In the control device, the electronic control unit may be configured to keep a host vehicle stopped with the use of an automatic brake when the host vehicle has stopped while the adaptive cruise control is being executed. The electronic control unit may be configured to release the automatic brake when the operation amount of the start operating member is larger than or equal to the first predetermined amount.

With the above configuration, when the operation amount of the start operating member is small, the internal combustion engine is automatically started in a state where the automatic brake is continuously applied. Therefore, it is possible to increase the temperature adjustment capability of an air conditioner or increase the rate of charge of a battery under a state that the vehicle is stopped. When the operation amount of the start operating member is large, the internal combustion engine is automatically started and the automatic brake is released, so it is possible to quickly cause the host vehicle to move.

In the control device, the electronic control unit may be configured to, in the case where the host vehicle has stopped while the adaptive cruise control is being executed and a preceding vehicle has not stopped, automatically start the internal combustion engine when the operation amount of the start operating member is larger than or equal to the first predetermined amount instead of the second predetermined amount.

When a starting operation is conducted in a state where the preceding vehicle is stopped, it is highly likely that the driver does not intend to move the host vehicle but intends to start the internal combustion engine while the host vehicle remains stopped. When the starting operation is conducted while the preceding vehicle has not stopped, it is highly likely that the driver intends to move the vehicle.

With the above configuration, when the preceding vehicle has not stopped, that is, when it is highly likely that the driver intends to move the host vehicle, it is possible to cause the host vehicle to move with the same operation feel irrespective of whether the adaptive cruise control is being executed or not being executed.

In the control device, the electronic control unit may be configured to decrease the second predetermined amount on the basis of the number of times the internal combustion engine is automatically started through the start operating member in a period from a start of the execution of the adaptive cruise control to a stop of the execution of the adaptive cruise control.

With the above configuration, when the internal combustion engine is frequently automatically started through an operation of the start operating member while the adaptive cruise control is being executed, it is possible to automatically start the internal combustion engine with a smaller operation amount of the start operating member. Therefore, it is possible to improve convenience at the time when the internal combustion engine is automatically started.

An example of the start operating member in the control device may be an accelerator pedal. In such a case, the operation amount may be at least one of a depression amount, a depression time and a depression speed of the accelerator pedal.

An example of the start operating member in the control device may be a steering wheel. In such a case, the operation amount may be at least one of a steering angle of the steering wheel and a variation speed of the steering angle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is a flowchart that shows the procedure of automatically starting an internal combustion engine according to a first embodiment;

DETAILED DESCRIPTION OF EMBODIMENTS

Figure 1:
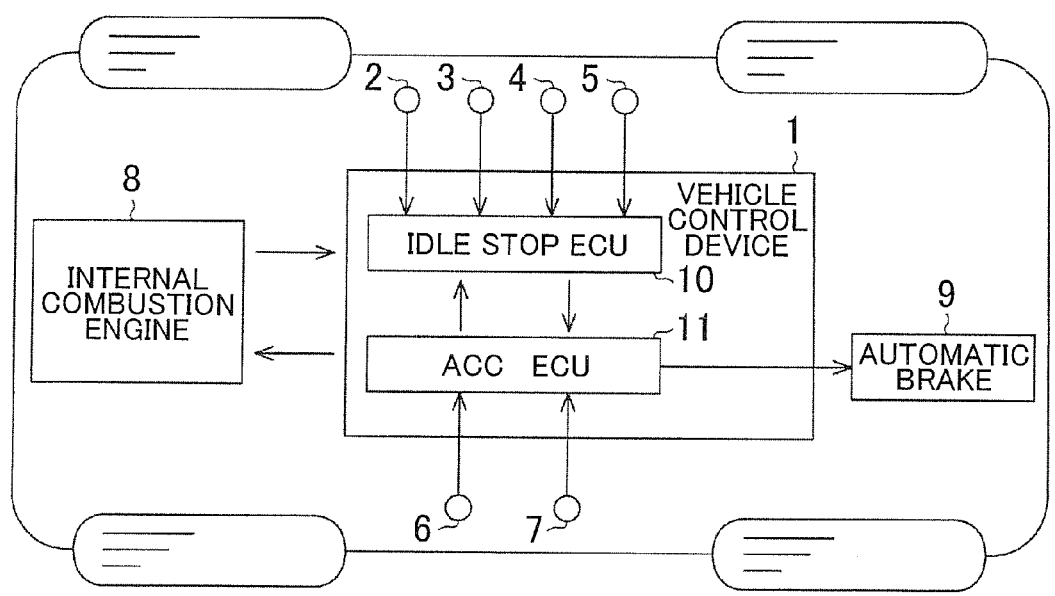
FIG. 1 is a schematic diagram that shows the schematic configuration of a vehicle control device.

Hereinafter, a first embodiment of a vehicle control device will be described with reference to FIG. 1 and FIG. 2. As shown in FIG. 1, various sensors are provided in a vehicle in order to detect an operating state of the vehicle. Detected signals of the various sensors are input to the vehicle control device 1 such as an electronic control unit. The sensors, for example, include an accelerator sensor 2, a brake stroke sensor 3, a vehicle speed sensor 4, a steering angle sensor 5, an ACC switch 6, a laser radar 7, and the like. The accelerator sensor 2 is used to detect the depression amount of an accelerator pedal. The brake stroke sensor 3 is used to detect the depression amount of a brake pedal. The vehicle speed sensor 4 is used to detect the travel speed of the host vehicle. The steering angle sensor 5 is used to detect the steering angle of a steering wheel. The ACC switch 6 is used to switch between execution and stop of an adaptive cruise control (ACC). The laser radar 7 is used to measure a distance between a preceding vehicle and the host vehicle.

The vehicle includes an internal combustion engine 8, an electric automatic brake 9, and the like. The internal combustion engine 8 serves as a driving source for the vehicle. The vehicle control device 1 executes various vehicle controls by controlling the internal combustion engine 8, the automatic brake 9, and the like, on the basis of the signals of the various sensors.

The vehicle control device 1 includes an idle stop ECU 10 and an ACC ECU 11. The idle stop ECU 10 executes an idle stop control. The ACC ECU 11 executes ACC. The ACC ECU 11 calculates a distance between the preceding vehicle and the host vehicle, the acceleration of the preceding vehicle, and the like, on the basis of the detected signal of the laser radar 7, or the like. The ACC ECU 11 keeps the distance between the preceding vehicle and the host vehicle constant by controlling the internal combustion engine 8 or the automatic brake 9 on the basis of the calculated results, and stops the host vehicle through braking of the automatic brake 9 when the preceding vehicle has stopped.

The idle stop ECU 10 automatically stops the internal combustion engine 8 when a predetermined condition is satisfied on the basis of the detected signals of the accelerator sensor 2, the brake stroke sensor 3, the vehicle speed sensor 4, the steering angle sensor 5, and the like. When the depression amount of the brake pedal becomes smaller than or equal to a predetermined amount through driver's operation or when the operation amount of the accelerator pedal or the steering wheel becomes larger than or equal to a predetermined amount, the idle stop ECU 10 automatically starts the automatically stopped internal combustion engine 8. That is, these brake pedal, accelerator pedal, steering wheel, and the like, correspond to start operating members.

In this way, the vehicle control device 1 is configured to automatically start the internal combustion engine 8 when the driver eases up depression of the brake pedal in a normal idle stop control in which ACC is not executed. However, the vehicle control device 1 is configured not to automatically start the internal combustion engine 8 even when the driver eases up depression of the brake pedal while ACC is being executed. Therefore, the driver is required to operate the accelerator pedal or the steering wheel in order to automatically start the internal combustion engine 8.

Next, the procedure at the time when the vehicle control device 1 automatically starts the internal combustion engine 8 will be described with reference to the flowchart shown in FIG. 2. Hereinafter, the case where the internal combustion engine 8 is automatically started through driver's depression of the accelerator pedal while ACC is being executed will be described as an example. A series of processes shown in the flowchart are executed by the vehicle control device 1 as interrupt process at predetermined intervals.

As shown in FIG. 2, in this process, initially, it is determined whether the internal combustion engine 8 is being automatically stopped (step S1). In this process, when it is determined that the internal combustion engine 8 is being automatically stopped (YES in step S1), it is subsequently determined whether ACC is being executed (step S2). The fact that ACC is being executed may be determined on the basis of, for example, the fact that the ACC switch 6 is turned on.

When ACC is not executed (NO in step S2), that is, in the case of an automatic start in a normal idle stop control, it is subsequently determined whether a driver's depression amount of the brake pedal is smaller than or equal to a predetermined amount B0 (step S3). When it is determined in the process of step S3 that the depression amount of the brake pedal is smaller than or equal to the predetermined amount B0 (YES in step S3), it is determined that the driver has eased up depression of the brake pedal, and the process proceeds to step S4. In step S4, the internal combustion engine 8 is automatically started. After that, the process ends.

When the depression amount of the brake pedal is larger than the predetermined amount B0 in the process of step S3 (NO in step S3), that is, when depression of the brake pedal has not been eased up, it is subsequently determined whether the depression amount of the accelerator pedal is larger than or equal to a first predetermined amount T1 (step S5). When it is determined in this process that the depression amount of the accelerator pedal is larger than or equal to the predetermined amount T1 (YES in step S5), the process proceeds to step S4. In step S4, the internal combustion engine 8 is automatically started. After that, the process ends. When the depression amount of the accelerator pedal is smaller than the predetermined amount T1 in the process of step S5 (NO in step S5), that is, when an operation of the start operating member, such as an operation to ease up depression of the brake pedal and an operation to depress the accelerator pedal, is not conducted in a state where the internal combustion engine 8 has been automatically stopped, the process ends without automatically starting the internal combustion engine 8.

When it is determined in the process of step S2 that ACC is being executed (YES in step S2), it is subsequently determined whether the depression amount of the accelerator pedal is larger than or equal to a second predetermined amount T2 (step S6). The second predetermined amount T2 is set to a value smaller than the first predetermined amount T1 while ACC is not executed (T2<T1). When it is determined in the process of step S6 that the depression amount of the accelerator pedal is larger than or equal to the predetermined amount T2 (YES in step S6), the process proceeds to step S7. In step S7, the internal combustion engine 8 is automatically started. After that, the process proceeds to step S8. In step S8, the automatic brake 9 is released. Then, the process ends.

When it is determined in the process of step S1 that the internal combustion engine 8 is not being stopped (NO in step S1) or when it is determined in the process of step S6 that the depression amount of the accelerator pedal is smaller than the predetermined amount T2 (NO in step S6), the process ends.

Next, the operation of the vehicle control device 1 according to the present embodiment will be described. In the automatic start process executed by the above-described vehicle control device 1, while ACC is being executed, the depression amount of the accelerator pedal, required to automatically start the internal combustion engine 8, reduces as compared to that when ACC is not executed. When the internal combustion engine 8 has been automatically started while ACC is being executed, the automatic brake 9 is released, and the host vehicle is quickly brought to a movable state.

According to the above-described first embodiment, the following first advantageous effect is obtained. While ACC is being executed, the depression amount of the accelerator pedal, required to automatically start the internal combustion engine 8, reduces as compared to that while ACC is not executed. Therefore, the driver is allowed to automatically start the internal combustion engine 8 with a smaller operation amount, so it is possible to improve convenience at the time when the internal combustion engine 8 is automatically started.

Next, a second embodiment of the vehicle control device 1 will be described with reference to FIG. 3A, FIG. 3B and FIG. 4. The present embodiment differs from the first embodiment in the procedure at the time when the internal combustion engine 8 is automatically started. The processes of step S1 to step S5 in FIG. 3A and FIG. 3B are similar to those of the first embodiment, so the detailed description is omitted.

Figure 3A:
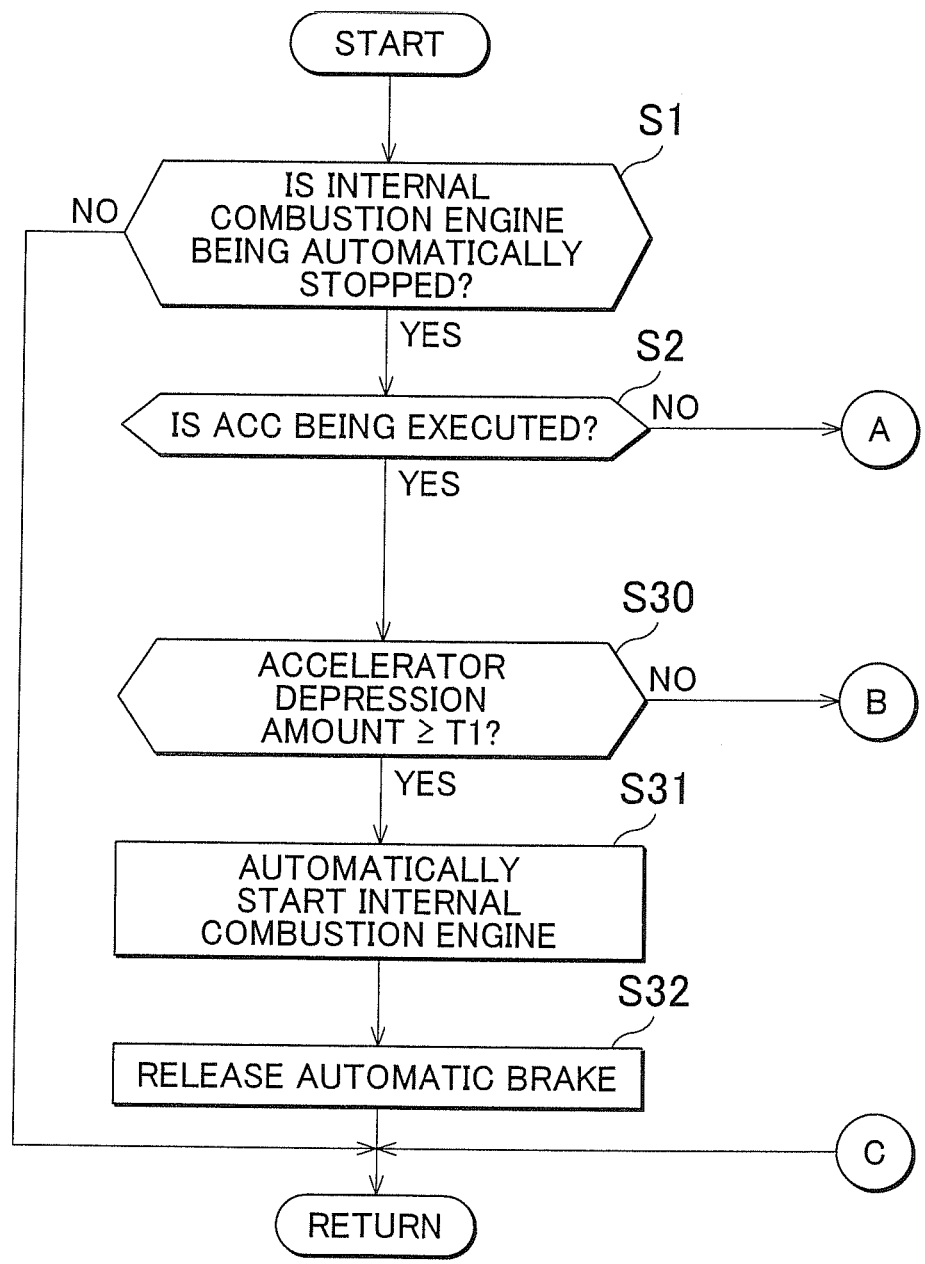
FIG. 3A and FIG. 3B are flowcharts that show the procedure of automatically starting the internal combustion engine according to a second embodiment.
Figure 3B:
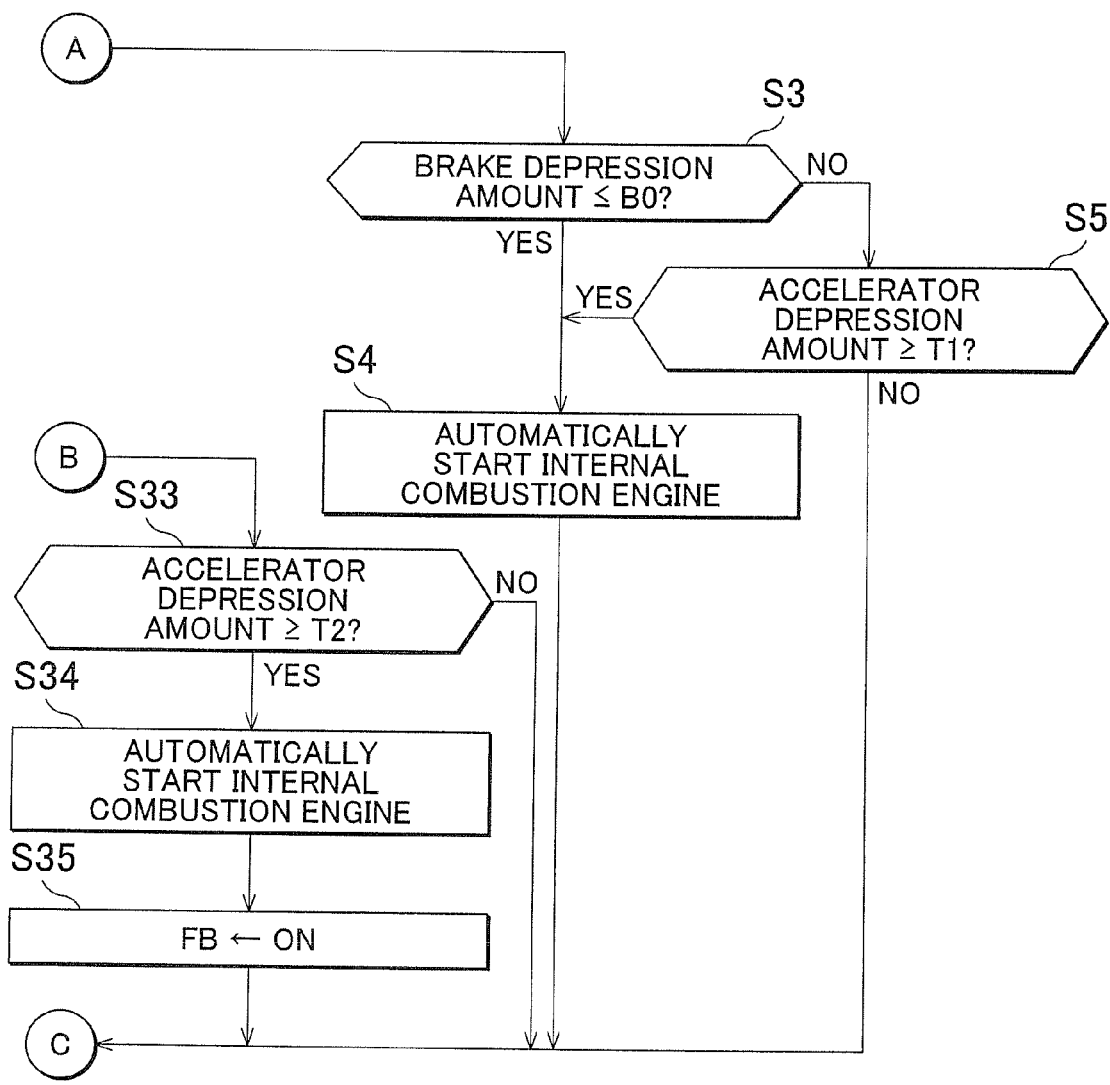

As shown in FIG. 3A and FIG. 3B, when it is determined in the process of step S2 that ACC is being executed (YES in step S2), it is subsequently determined whether the depression amount of the accelerator pedal is larger than or equal to the predetermined amount T1 (step S30). When it is determined in the process of step S30 that the depression amount of the accelerator pedal is larger than or equal to the predetermined amount T1 (YES in step S30), the process proceeds to step S31. In step S31, the internal combustion engine 8 is automatically started. After that, the process proceeds to step S32. In step S32, the automatic brake 9 is released. Then, the process ends.

When it is determined in the process of step S30 that the depression amount of the accelerator pedal is smaller than the predetermined amount T1 (NO in step S30), it is subsequently determined whether the depression amount of the accelerator pedal is larger than or equal to the predetermined amount T2 (step S33). When it is determined in the process of step S33 that the depression amount of the accelerator pedal is larger than or equal to the predetermined amount T2 (YES in step S33), that is, when the depression amount of the accelerator pedal is larger than or equal to the predetermined amount T2 and smaller than the predetermined amount T1, the process proceeds to step S34. In step S34, the internal combustion engine 8 is automatically started. After that, the process proceeds to step S35. In step S35, a flag FB is set to an on state. Then, the process ends.

When it is determined in the process of step S33 that the depression amount of the accelerator pedal is smaller than the predetermined amount T2 (NO in step S33), the process ends. When the host vehicle is stopped while ACC is being executed, the host vehicle is kept stopped by the automatic brake 9. Therefore, it is required to release the automatic brake 9 in order to allow the vehicle to move. In the above-described process, when the depression amount of the accelerator pedal is larger than or equal to the predetermined amount T2 and smaller than the predetermined amount T1 while ACC is being executed, the internal combustion engine 8 is automatically started. However, the automatic brake 9 is not released.

Next, the procedure of releasing the automatic brake 9 in such a case will be described with reference to the flowchart shown in FIG. 4. A series of processes shown in the flowchart are executed by the vehicle control device 1 as interrupt process at predetermined intervals.

Figure 4:
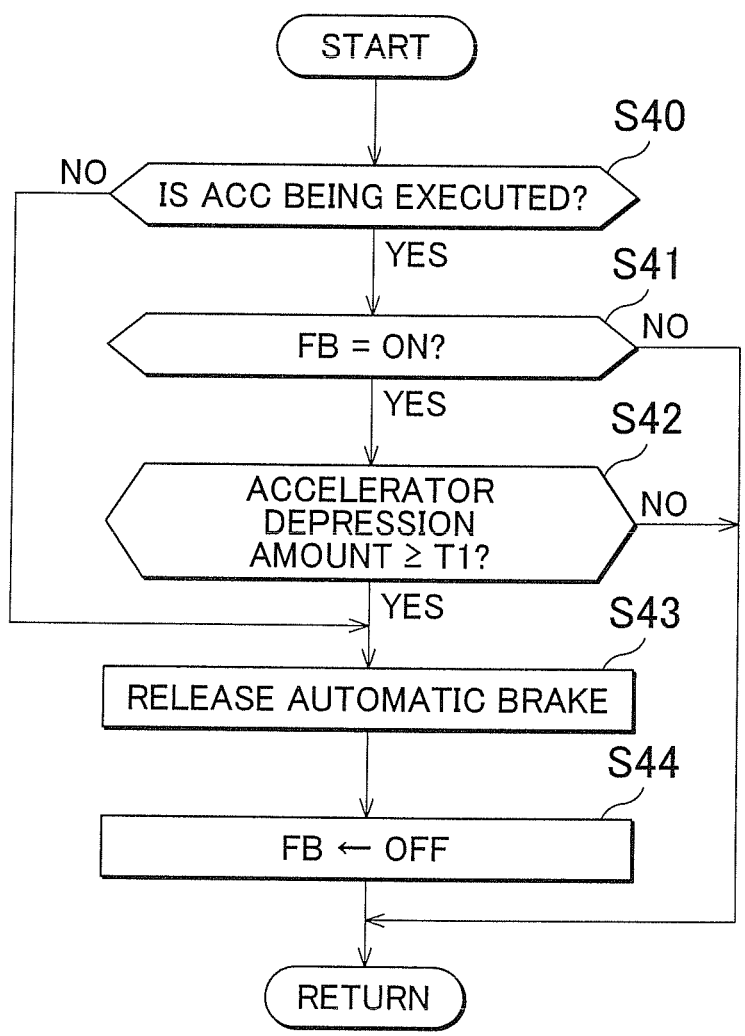
FIG. 4 is a flowchart that shows an example of the procedure of releasing an automatic brake.

As shown in FIG. 4, in this process, initially, it is determined whether ACC is being executed (step S40). When ACC is being executed (YES in step S40), it is determined whether the flag FB is in the on state (step S41). When it is determined in the process of step S41 that the flag FB is in the on state (YES in step S41), that is, when the internal combustion engine 8 has been automatically started but the automatic brake 9 has not been released yet, it is subsequently determined whether the depression amount of the accelerator pedal is larger than or equal to the predetermined amount T1 (step S42). When it is determined in the process of step S42 that the depression amount of the accelerator pedal is larger than or equal to the predetermined amount T1 (YES in step S42), the process proceeds to step S43. In step S43, the automatic brake 9 is released. After that, the process proceeds to step S44. In step S44, the flag FB is set to an off state. Then, the process ends. When ACC is not executed (NO in step S40), the process proceeds to step S43. In step S43, the automatic brake 9 is released. After that, the flag FB is set to the off state. Then, the process ends.

When it is determined in the process of step S41 that the flag FB is in the off state (NO in step S41) or when it is determined in the process of step S42 that the depression amount of the accelerator pedal is smaller than the predetermined amount T1 (NO in step S42), the process ends.

Next, the operation of the vehicle control device 1 according to the present embodiment will be described. In the above-described vehicle control device 1, while ACC is being executed, when the driver's depression amount of the accelerator pedal is small, that is, when the depression amount of the accelerator pedal is larger than or equal to the predetermined amount T2 and smaller than the predetermined amount T1, the automatic brake 9 is continuously applied even when the internal combustion engine 8 is automatically started. When the depression amount of the accelerator pedal is large, that is, when the depression amount of the accelerator pedal is larger than or equal to the predetermined amount T1, the automatic brake 9 is released when the internal combustion engine 8 is automatically started. Through the above automatic brake control, when the depression amount of the accelerator pedal is small, the vehicle is kept stopped even when the internal combustion engine 8 is automatically started; whereas, when the depression amount of the accelerator pedal is large, the automatic brake 9 is released when the internal combustion engine 8 is automatically started, and, after the internal combustion engine 8 has been automatically started, the vehicle is quickly brought to a movable state.

According to the above-described second embodiment, the following second advantageous effect is further obtained in addition to the above-described first advantageous effect. While ACC is being executed, when the driver's depression amount of the accelerator pedal is small, it is possible to increase the temperature adjustment capability of an air conditioner or increase the rate of charge of a battery under a state that the vehicle is stopped. When the depression amount of the accelerator pedal is large, it is possible to quickly move the host vehicle.

Figure 5A:
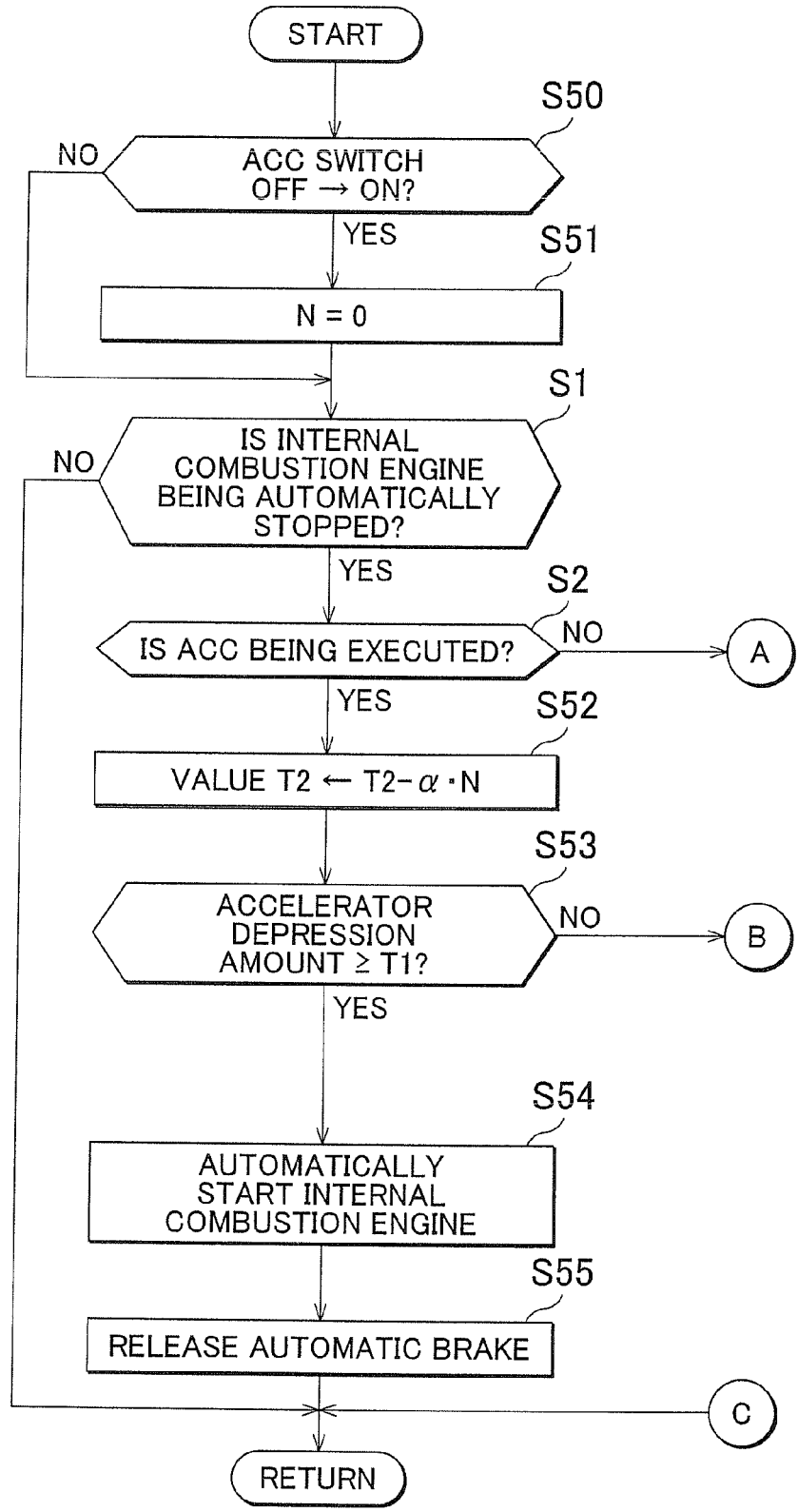
FIG. 5A and FIG. 5B are flowcharts that show the procedure of automatically starting the internal combustion engine according to a third embodiment.
Figure 5B:
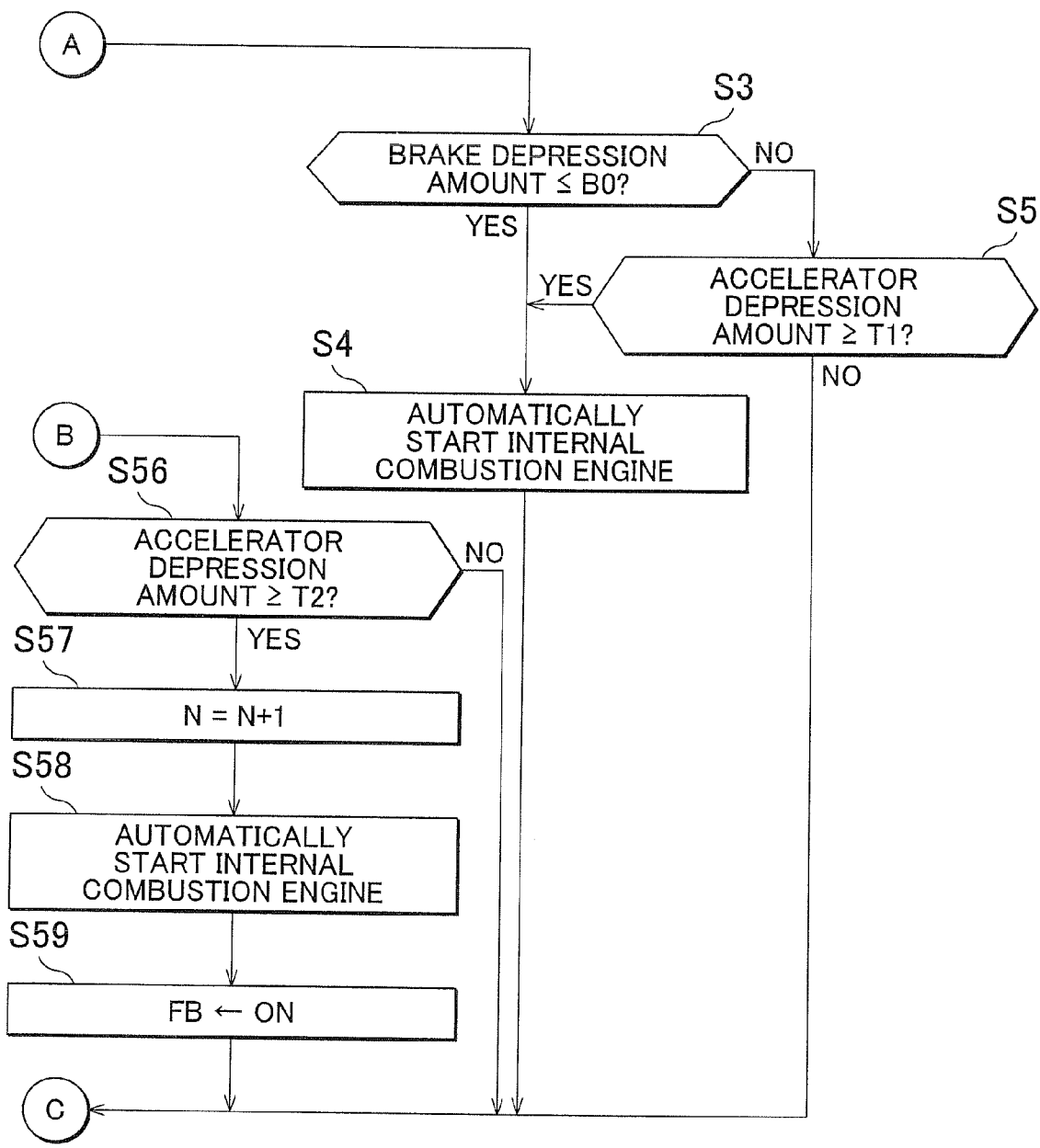

Next, a third embodiment of the vehicle control device 1 will be described with reference to FIG. 5A and FIG. 5B. The present embodiment differs from the above-described embodiments in the procedure at the time when the internal combustion engine 8 is automatically started. The processes of step S1 to step S5 in FIG. 5A and FIG. 5B are similar to those of the above-described embodiments, so the detailed description is omitted. In this series of processes, the second predetermined amount T2 is further decreased on the basis of the number of times the internal combustion engine 8 has been automatically started by depressing the accelerator pedal in a period from the start of execution of ACC to the stop of execution of ACC.

As shown in FIG. 5A and FIG. 5B, in this process, initially, it is determined whether the ACC switch 6 has been switched from the off state to the on state (step S50). When it is determined in the process of step S50 that the ACC switch 6 has been switched from the off state to the on state (YES in step S50), that is, when this process is the first process after the ACC switch 6 has been switched, an automatic start counter N is set to 0 (step S51), and the process proceeds to step S1. When negative determination is made in the process of step S50 (NO in step S50), the process proceeds to step S1 without executing the process of step S51. When affirmative determination is made in the processes of step S1 and step S2, the process proceeds to step S52.

In the process of step S52, a value obtained by multiplying a predetermined amount α by the automatic start counter N is subtracted from the initial value of the predetermined amount T2 prestored in the vehicle control device 1, and the resultant value is set as the predetermined amount T2. The predetermined amount α is set to a value smaller than the predetermined amount T2 (α<T2). The thus calculated predetermined amount T2 is stored in the vehicle control device 1 until the process ends. When the value (T2−α·N) obtained by subtracting the value, obtained by multiplying the predetermined amount α by the automatic start counter N, from the predetermined amount T2 has reached a predetermined lower limit value, the predetermined amount T2 is kept at the lower limit value. After that, the process proceeds to step S53. In S53, it is determined whether the depression amount of the accelerator pedal is larger than or equal to the predetermined amount T1. When it is determined that the depression amount of the accelerator pedal is larger than or equal to the predetermined amount T1 (YES in step S53), the process proceeds to step S54. In step S54, the internal combustion engine 8 is automatically started. After that, the process proceeds to step S55. In step S55, the automatic brake 9 is released. Then, the process ends.

When it is determined in the process of step S53 that the depression amount of the accelerator pedal is smaller than the predetermined amount T1 (NO in step S53), it is subsequently determined whether the depression amount of the accelerator pedal is larger than or equal to the calculated predetermined amount T2 (step S56). When it is determined that the depression amount of the accelerator pedal is larger than or equal to the predetermined amount T2 (YES in step S56), that is, when the depression amount of the accelerator pedal is larger than or equal to the predetermined amount T2 and smaller than the predetermined amount T1, the process proceeds to step S57. In step S57, the automatic start counter N is incremented. After that, the process proceeds to step S58. In step S58, the internal combustion engine 8 is automatically started, and the process proceeds to step S59. In step S59, the flag FB is set to the on state. Then, the process ends. When the flag FB is set to the on state, the automatic brake 9 is released when the depression amount of the accelerator pedal becomes larger than or equal to the predetermined amount T1 thereafter through the process shown in FIG. 4.

When it is determined in the process of step S56 that the depression amount of the accelerator pedal is smaller than the predetermined amount T2 (NO in step S56), the process ends.

Next, the operation of the vehicle control device 1 according to the present embodiment will be described. In the above-described vehicle control device 1, the number of times the depression amount of the accelerator pedal becomes larger than or equal to the predetermined amount T2 and smaller than the predetermined amount T1, that is, the number of times the process of automatically starting the internal combustion engine 8 and continuously applying the automatic brake 9 is executed, is counted from when the ACC switch 6 has been switched from the off state to the on state. The predetermined amount T2 is further reduced as the number of times increases.

According to the above-described third embodiment, the following third advantageous effect is obtained in addition to the above-described first advantageous effect and second advantageous effect. While ACC is being executed, when the driver frequently automatically starts the internal combustion engine 8 while stopping the host vehicle through accelerator operation, the predetermined amount T2 reduces. Therefore, it is possible to automatically start the internal combustion engine 8 with a smaller operation amount as the frequency of an automatic start of the internal combustion engine 8 increases. Therefore, it is possible to further improve convenience at the time when the internal combustion engine 8 is automatically started.

Next, a fourth embodiment of the vehicle control device 1 will be described with reference to FIG. 6A and FIG. 6B. The present embodiment differs from the above-described embodiments in the procedure at the time when the internal combustion engine 8 is automatically started. The processes of step S50, step S51 and step S1 to step S5 in FIG. 6A and FIG. 6B are similar to those of the third embodiment, so the detailed description is omitted.

Figure 6A:
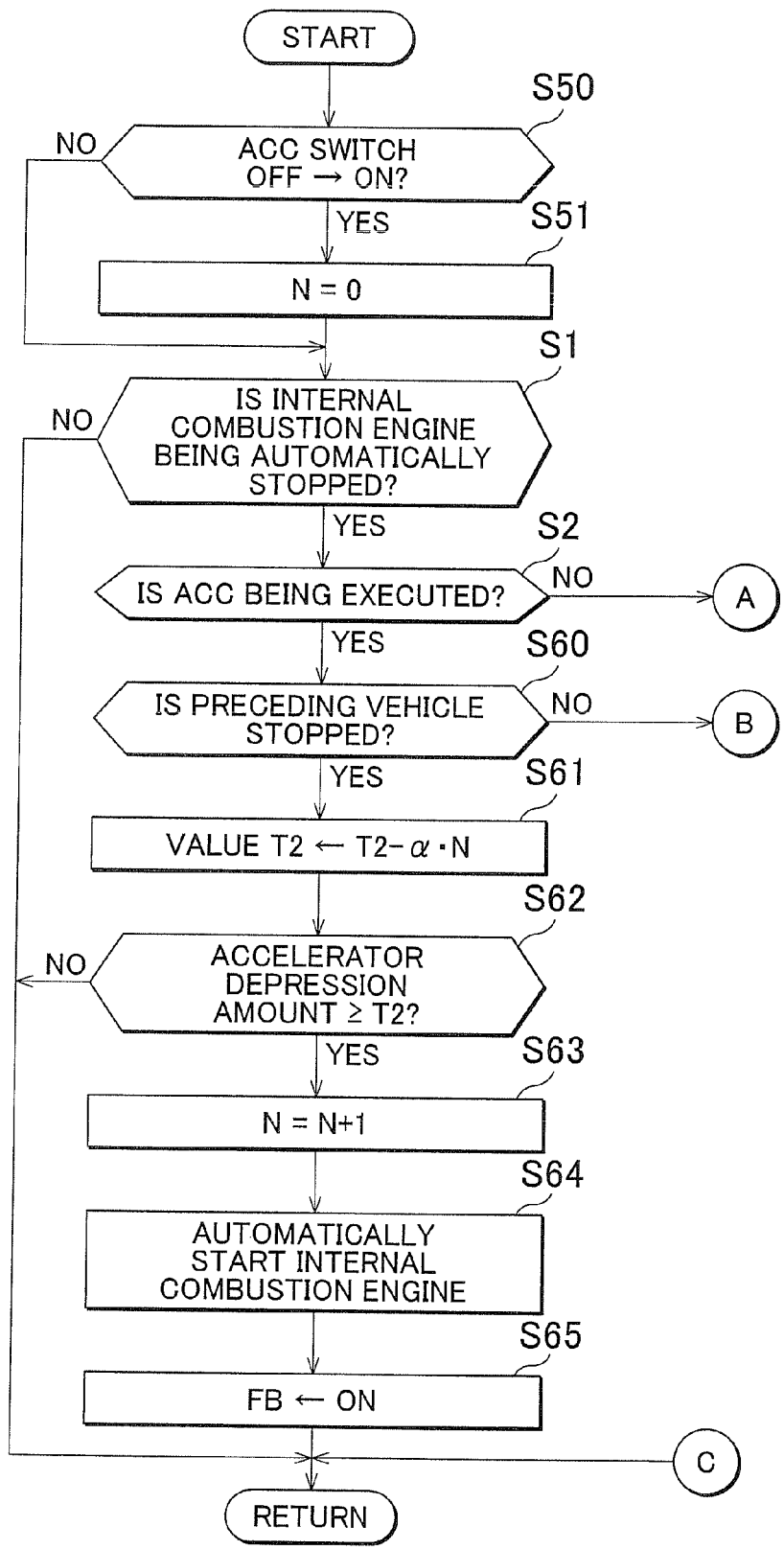
FIG. 6A and FIG. 6B are flowcharts that show the procedure of automatically starting the internal combustion engine according to a fourth embodiment.
Figure 6B:
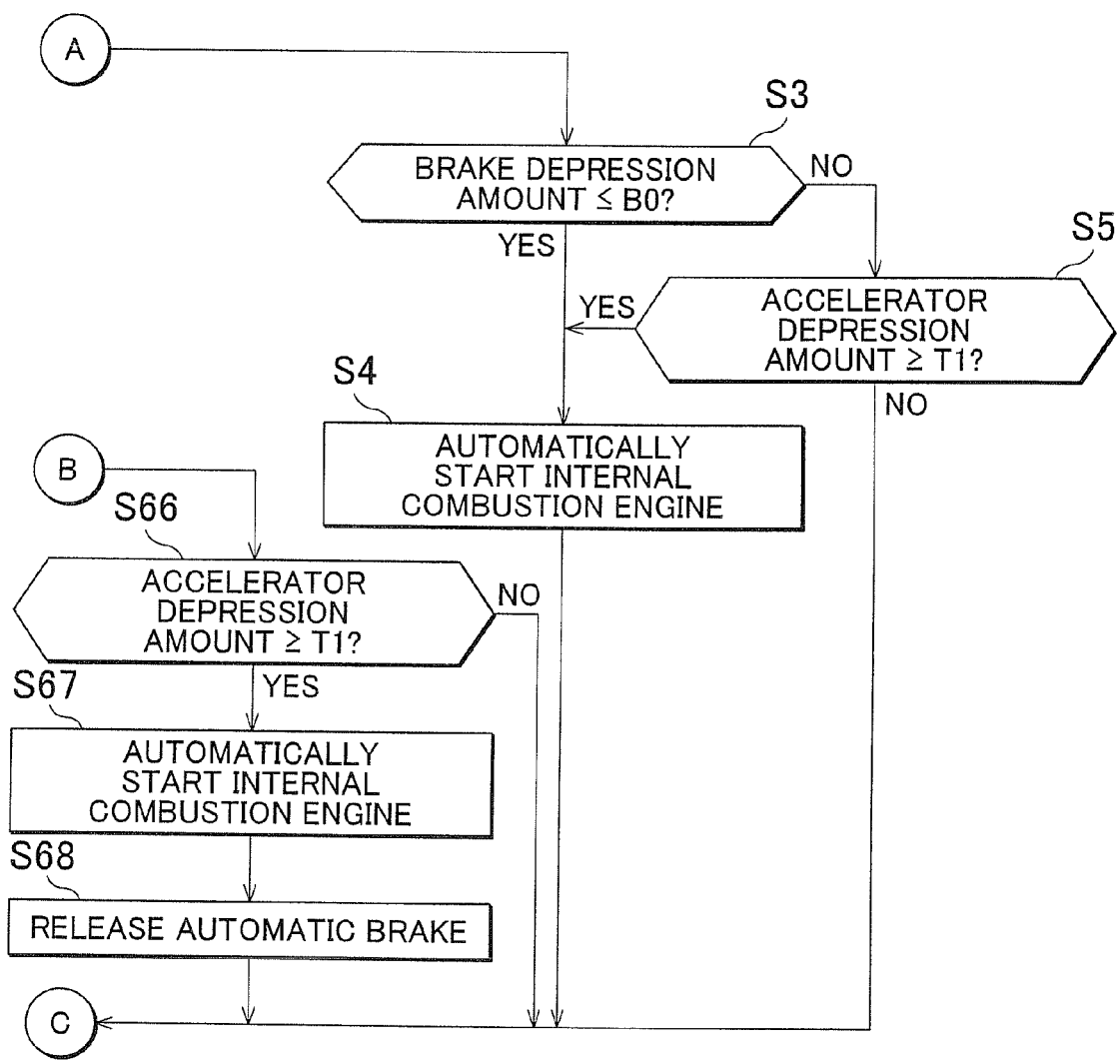

As shown in FIG. 6A and FIG. 6B, when it is determined in the process of step S2 that ACC is being executed (YES in step S2), it is subsequently determined whether the preceding vehicle is stopped (step S60). When it is determined in the process of step S60 that the preceding vehicle is stopped (YES in step S60), the second predetermined amount T2 is reset (step S61) as in the case of the above-described process of S52 in FIG. 3A and FIG. 3B. The set predetermined amount T2 is stored in the vehicle control device 1 until the process ends.

After that, the process proceeds to step S62. In step S62, it is determined whether the depression amount of the accelerator pedal is larger than or equal to the set predetermined amount T2. When it is determined that the depression amount of the accelerator pedal is smaller than the predetermined amount T2 (NO in step S62), the process ends. When it is determined that the depression amount of the accelerator pedal is larger than or equal to the predetermined amount T2 (YES in step S62), the process proceeds to step S63. In step S63, the automatic start counter N is incremented. After that, the process proceeds to step S64. In step S64, the internal combustion engine 8 is automatically started. After that, the process proceeds to step S65. In step S65, the flag FB is set to the on state. Then, the process ends. When the flag FB is set to the on state in this way, the automatic brake 9 is released when the depression amount of the accelerator pedal becomes larger than or equal to the predetermined amount T1 thereafter through the process shown in FIG. 4.

When it is determined in the process of step S60 that the preceding vehicle is not stopped (NO in step S60), it is subsequently determined whether the depression amount of the accelerator pedal is larger than or equal to the first predetermined amount T1 instead of the second predetermined amount T2 (step S66). When it is determined in the process of step S66 that the depression amount of the accelerator pedal is larger than or equal to the predetermined amount T1 (YES in step S66), the process proceeds to step S67. In step S67, the internal combustion engine 8 is automatically started. After that, the process proceeds to step S68. In step S68, the automatic brake 9 is released. Then, the process ends.

When it is determined in the process of step S66 that the depression amount of the accelerator pedal is smaller than the predetermined amount T1 (NO in step S66), the process ends.

Next, the operation of the vehicle control device 1 according to the present embodiment will be described. When the accelerator pedal is operated in a state where the preceding vehicle is stopped, it is highly likely that the driver does not intend to move the host vehicle but intends to start the internal combustion engine 8 while the host vehicle remains stopped. When the accelerator pedal is operated in a state where the preceding vehicle is not stopped, it is highly likely that the driver intends to move the vehicle.

In the above-described vehicle control device 1, when the preceding vehicle is stopped in the case where the host vehicle has stopped while ACC is being executed, the internal combustion engine 8 is automatically started and the automatic brake 9 is continuously applied in the case where the driver's depression amount of the accelerator pedal is small. When the depression amount of the accelerator pedal increases thereafter, the automatic brake 9 is released.

In contrast to this, when the preceding vehicle is not stopped in the case where the host vehicle has stopped while ACC is being executed, the vehicle control device 1 automatically starts the internal combustion engine 8 and releases the automatic brake 9 when the depression amount of the accelerator pedal is larger than or equal to the predetermined amount T1 larger than the predetermined amount T2.

When the preceding vehicle is stopped while ACC is being executed, the number of times the internal combustion engine 8 has been automatically started through accelerator operation is counted, and the predetermined amount T2 is further reduced as the number of times increases.

According to the above-described fourth embodiment, the following fourth advantageous effect is further obtained in addition to the first advantageous effect and the second advantageous effect. When the internal combustion engine 8 is frequently. automatically started through the operation of the accelerator pedal when the preceding vehicle is stopped while ACC is being executed, it is possible to automatically start the internal combustion engine 8 with a smaller operation amount of the start operating member. When the preceding vehicle is not stopped, that is, when it is highly likely that the driver intends to move the host vehicle, it is possible to move the host vehicle with the same operation feel irrespective of whether the execution of ACC is being executed or stopped.

The above-described embodiments may be modified into the following alternative embodiments. These alternative embodiments may be implemented in combination.

In the first embodiment, the number of times the internal combustion engine has been automatically started through accelerator operation while ACC is being executed may be counted after the ACC switch has been switched from the off state to the on state, and the predetermined amount T2 may be further decreased on the basis of the counted number of times. With this configuration as well, a similar advantageous effect to the first advantageous effect is obtained.

In the third embodiment, when the depression amount of the accelerator pedal becomes larger than or equal to the predetermined amount T2 and smaller than the predetermined amount T1 while ACC is being executed, the automatic start counter N is incremented. Instead or in addition to this configuration, when the depression amount of the accelerator pedal becomes larger than or equal to the predetermined amount T1 while ACC is being executed, the automatic start counter N may be incremented similarly. With this configuration, when the internal combustion engine is frequently automatically started through the operation of the accelerator pedal while ACC is being executed, it is possible to automatically start the internal combustion engine 8 with a smaller operation amount of the accelerator pedal.

In the fourth embodiment, when the internal combustion engine 8 is automatically started at the time when the preceding vehicle is stopped, the automatic start counter N is incremented. Instead or in addition to this configuration, when the internal combustion engine 8 is automatically started at the time when the preceding vehicle is not stopped as well, the automatic start counter N may be incremented similarly. With this configuration, when the internal combustion engine 8 is frequently automatically started through accelerator operation while ACC is being executed, it is possible to automatically start the internal combustion engine 8 with a smaller operation amount of the accelerator pedal.

In the third and fourth embodiments, a value obtained by multiplying the predetermined amount $\alpha$ by the automatic start counter N is subtracted from the initial value of the predetermined amount T2 prestored in the vehicle control device 1, and the resultant value is set as the predetermined amount T2. However, a method of reducing the predetermined amount T2 on the basis of the automatic start counter N is not limited to this configuration. For example, a map that stores the correlation between the predetermined amount T2 and the automatic start counter N may be stored in the vehicle control device 1, and the predetermined amount T2 may be set through map computation each time. In short, the predetermined amount T2 should be set to a smaller value as the number of times the internal combustion engine 8 has been automatically started through accelerator operation while ACC is being executed increases. In the fourth embodiment, the subtracting process of the second predetermined amount T2 may be omitted.

In the above embodiments, the internal combustion engine 8 is automatically started on the condition that the depression amount of the accelerator pedal is larger than or equal to the predetermined amount. Instead, the internal combustion engine 8 may be automatically started on the condition that a depression time of the accelerator pedal is longer than or equal to a predetermined value or a depression speed of the accelerator pedal is higher than or equal to a predetermined value. The internal combustion engine 8 may be automatically started on the basis of an OR condition or an AND condition of a combination of these conditions. In such a case, the predetermined amount while ACC is being executed should be reduced through comparison with the predetermined amount while ACC is not executed. With this configuration as well, a similar advantageous effect to the first advantageous effect is obtained.

In the above embodiments, the internal combustion engine 8 is automatically started on the basis of the operation amount of the accelerator pedal. Instead, the internal combustion engine 8 may be automatically started on the basis of an operation amount of the steering wheel instead of the accelerator pedal. In such a case, the steering angle of the steering wheel or a variation speed of the steering angle should be detected by the steering angle sensor 5, or the like, and the internal combustion engine 8 should be automatically started on the condition that the operation amount is larger than or equal to the predetermined amount. The internal combustion engine 8 may be automatically started on the basis of an OR condition or an AND condition of a combination of these conditions. The predetermined amount while ACC is being executed is reduced through comparison with the predetermined amount while ACC is not executed. With this configuration as well, a similar advantageous effect to the first advantageous effect is obtained.

What is claimed is:

1. A control device for a vehicle including an internal combustion engine, a brake pedal, and a start operating member that is different from the brake pedal, comprising:
   an electronic control unit configured to execute an adaptive cruise control and to execute an idle stop control;
   the electronic control unit configured to automatically start the internal combustion engine when an operation amount of the start operating member is larger than or equal to a predetermined amount while the idle stop control is being executed,
   the electronic control unit configured to set the predetermined amount to a first predetermined amount when the adaptive cruise control is not executed, and
   the electronic control unit configured to set the predetermined amount to a second predetermined amount when the adaptive cruise control is being executed, the second predetermined amount being smaller than the first predetermined amount, the second predetermined amount is greater than zero.

2. The control device according to claim 1, wherein
   the electronic control unit is configured to keep a host vehicle stopped with the use of an automatic brake when the host vehicle has stopped while the adaptive cruise control is being executed, and
   the electronic control unit is configured to release the automatic brake when the operation amount of the start operating member is larger than or equal to the first predetermined amount.

3. The control device according to claim 2, wherein
   the electronic control unit is configured to, in the case where the host vehicle has stopped while the adaptive cruise control is being executed and a preceding vehicle has not stopped, automatically start the internal combustion engine when the operation amount of the start operating member is larger than or equal to the first predetermined amount instead of the second predetermined amount.

4. The control device according to claim 1, wherein
   the electronic control unit is configured to decrease the second predetermined amount on the basis of a number of times the internal combustion engine is automatically started through the start operating member in a period from a start of the execution of the adaptive cruise control to a stop of the execution of the adaptive cruise control.

5. The control device according to claim 1, wherein
   the start operating member is an accelerator pedal, and
   the operation amount is at least one of a depression amount, a depression time and a depression speed of the accelerator pedal.

6. The control device according to claim 1, wherein
   the start operating member is a steering wheel, and
   the operation amount is at least one of a steering angle of the steering wheel and a variation speed of the steering angle.

7. A control method for a vehicle including an internal combustion engine, a brake pedal, a start operating member that is different from the brake pedal, and an electronic control unit, the control method, executed by the electronic control unit, comprising:
   executing an adaptive cruise control and executing an idle stop control;
   automatically starting the internal combustion engine when an operation amount of the start operating member is larger than or equal to a predetermined amount while the idle stop control is being executed;
   setting the predetermined amount to a first predetermined amount when the adaptive cruise control is not executed; and
   setting the predetermined amount to a second predetermined amount when the adaptive cruise control is being executed, the second predetermined amount being smaller than the first predetermined amount, the second predetermined amount is greater than zero.

8. A control device for a vehicle including an internal combustion engine, a brake pedal, and a start operating member that is different from the brake pedal, comprising:
   an electronic control unit configured to execute an adaptive cruise control and to execute an idle stop control;
   the electronic control unit configured to automatically start the internal combustion engine when an operation amount of the start operating member is larger than or equal to a predetermined amount while the idle stop control is being executed,
   the electronic control unit configured to set the predetermined amount to a first predetermined amount when the adaptive cruise control is not executed, the electronic control unit configured to set the predetermined amount to a second predetermined amount when the adaptive cruise control is being executed, the second predetermined amount being smaller than the first predetermined amount, and the electronic control unit is configured to decrease the second predetermined amount on the basis of a number of times the internal combustion engine is automatically started through the start operating member in a period from a start of the execution of the adaptive cruise control to a stop of the execution of the adaptive cruise control.

* * * * *